US011498390B2

(12) United States Patent
Oshikiri et al.

(10) Patent No.: US 11,498,390 B2
(45) Date of Patent: Nov. 15, 2022

(54) VEHICULAR AIR CONDITIONER

(71) Applicant: Toyota Jidosha Kabushiki Kaisha, Toyota (JP)

(72) Inventors: Rino Oshikiri, Toyota (JP); Hidekazu Hirabayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 338 days.

(21) Appl. No.: 16/990,189

(22) Filed: Aug. 11, 2020

(65) Prior Publication Data

US 2021/0061065 A1 Mar. 4, 2021

(30) Foreign Application Priority Data

Sep. 2, 2019 (JP) .............................. JP2019-159412

(51) Int. Cl.
*B60H 1/00* (2006.01)

(52) U.S. Cl.
CPC ..... *B60H 1/00864* (2013.01); *B60H 1/00007* (2013.01); *B60H 1/00564* (2013.01)

(58) Field of Classification Search
CPC ............ B60H 1/00864; B60H 1/00007; B60H 1/00564; B60H 1/00021; B60H 1/034; B60H 2001/3255

See application file for complete search history.

(56) References Cited

U.S. PATENT DOCUMENTS

2016/0332503 A1 11/2016 Hirano et al.
2021/0086591 A1* 3/2021 Yamashita ........... B60H 1/3219

FOREIGN PATENT DOCUMENTS

| JP | 2004-306859 A |   | 11/2004 |              |
|----|---------------|---|---------|--------------|
| JP | 2012048821 A  | * | 3/2012  | ... B60L 50/71 |
| JP | 2014-189077 A |   | 10/2014 |              |
| JP | 2015-136963 A |   | 7/2015  |              |

* cited by examiner

*Primary Examiner* — Marc E Norman
(74) *Attorney, Agent, or Firm* — Dinsmore & Shohl LLP

(57) ABSTRACT

In a situation where a temperature in a motor compartment is higher than a temperature of outside air, an inside air introduction rate increasing control is performed in which an inside air introduction rate is changed to be increased on a condition that there is no request for warming an inside of the vehicle cabin, the air conditioner is off, and air is being blown in an outside air introduction mode, and on the other hand, the inside air introduction rate increasing control is prohibited on a condition that there is a request for warming the inside of the vehicle cabin, the vehicular air conditioner is off, and air is being blown in the outside air introduction mode. In this way, heating efficiency can be improved by effectively utilizing the heat in the motor compartment to contribute to warming the inside of the vehicle cabin.

4 Claims, 3 Drawing Sheets

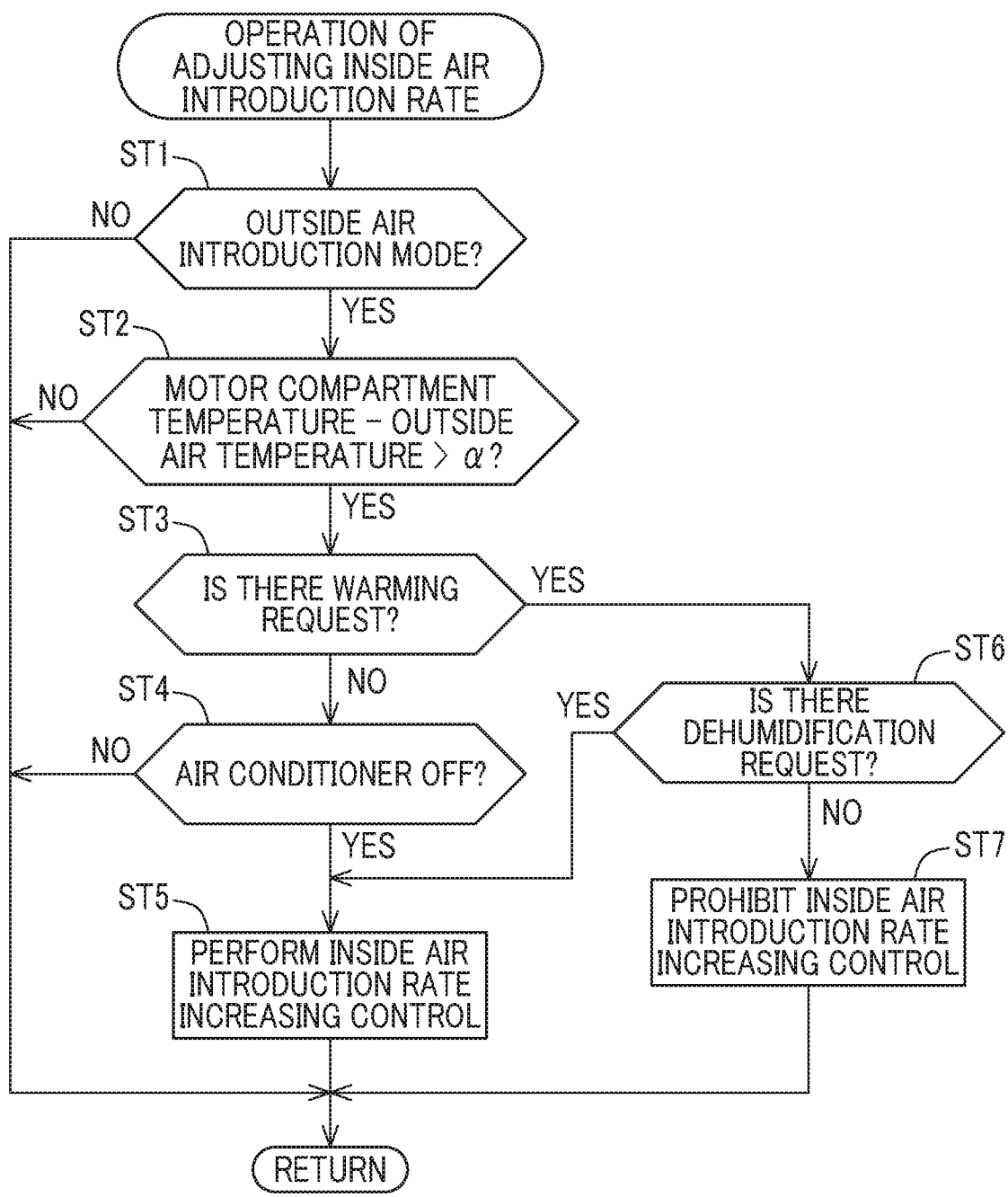

VEHICULAR AIR CONDITIONER

CROSS-REFERENCE TO RELATED APPLICATIONS

This application claims priority to Japanese Patent Application No. 2019-159412 filed on Sep. 2, 2019, which is incorporated herein by reference in its entirety including the specification, drawings and abstract.

BACKGROUND

1. Technical Field

The disclosure relates to a vehicular air conditioner. More particularly, the disclosure relates to an improved vehicular air conditioner capable of adjusting an inside air introduction rate (also referred to as an inside air circulation rate) of air blown into a vehicle cabin.

2. Description of Related Art

Japanese Unexamined Patent Application Publication No. 2004-306859 (JP 2004-306859 A) discloses a vehicular air conditioner (hereinafter simply referred to as an air conditioner) capable of switching between an outside air introduction mode and an inside air circulation mode by selection of an occupant, where it is suggested that an inside air introduction rate (the ratio of the volume of inside air circulated, in the volume of air blown into a vehicle cabin) is automatically adjusted according to circumstantial conditions.

Specifically, in the air conditioner disclosed in JP 2004-306859 A, in order to suppress a situation in which, in a state where the air conditioner is off (a compressor of a heat pump is stopped) and air is being blown in an outside air introduction mode, warm air warmed by the heat in an engine compartment (warm air generated by warming outside air that has been introduced) is blown into the vehicle cabin, thereby giving the occupant a feeling of discomfort, the inside air introduction rate is set to be larger than zero when the temperature of the air blown into the vehicle cabin is higher than that of the outside air by a predetermined temperature or more. This makes the vehicle cabin air of a relatively low temperature mix into the outside air (warm air warmed by the heat in the engine compartment), thereby suppressing the increase in temperature of the air blown into the vehicle cabin.

SUMMARY

The present inventors have focused on improving warming efficiency by effectively using heat in an engine compartment (in the case of the electric vehicle, in a motor compartment; hereinafter the engine compartment and the motor compartment are collectively referred to as the motor compartment) to contribute to warming an inside of the vehicle cabin, when a request for warming a vehicle cabin is made in a state where air is being blown in an outside air introduction mode.

However, in the technology disclosed in JP 2004-306859 A, when the interior of the vehicle cabin is to be warmed by effectively using the heat in the motor compartment, the inside air introduction rate is set to be larger than 0 (to lower the temperature of the warm air once warmed) when the temperature of the air blown into the vehicle cabin is higher than the outside air temperature by a predetermined temperature or more, and thus there is a limit to improving the warming efficiency by effectively using the heat in the motor compartment.

In particular, for an electric vehicle that employs a heat pump, a water heater, or the like as a warming device (air conditioner), the air conditioning load of the warming device is increased when the heat in the motor compartment cannot be effectively utilized, and as a result, the energy consumption rate becomes worse.

The disclosure has been made in consideration of the above circumstances, and an object of the disclosure is to provide a vehicular air conditioner capable of improving warming efficiency by effectively using heat in a motor compartment to contribute to heating the inside of a vehicle cabin.

An aspect of the disclosure relates to a vehicular air conditioner. The vehicular air conditioner allows a volume of outside air introduced into a vehicle cabin and a volume of inside air circulated to be varied and an inside air introduction rate, which is a ratio of the volume of inside air circulated in a volume of air blown into the vehicle cabin, to be adjusted. The vehicular air conditioner includes an inside air introduction rate controller, and an inside air introduction rate control prohibitor. In a situation where a temperature in a motor compartment is higher than a temperature of outside air, the inside air introduction rate controller is configured to perform an inside air introduction rate increasing control that changes the inside air introduction rate to be increased on a condition that there is no request for warming an inside of the vehicle cabin, the air conditioner is off, and air is being blown in an outside air introduction mode, and the inside air introduction rate control prohibitor is configured to prohibit the inside air introduction rate increasing control on a condition that there is a request for warming the inside of the vehicle cabin, the vehicular air conditioner is off, and air is being blown in the outside air introduction mode.

Here, "air conditioner is off" refers to a state in which the operation of the air conditioner for cooling the vehicle cabin (for a heat pump type air conditioner, an operation of the compressor for performing the cooling operation is stopped.

According to the aspect, when the air conditioner is off and the air is being blown in the outside air introduction mode without a request for warming the inside of the vehicle cabin, the inside air introduction rate is increased (by performing the inside air introduction rate increasing control) and the air of the relatively low temperature in the vehicle cabin is mixed into the outside air (warm air warmed by the heat in the motor compartment) to suppress the rise in the temperature of the air blown into the vehicle cabin, such that the occupant (occupant who does not request warming) does not feel discomfort due to the warm air warmed by the heat in the motor compartment being blown into the vehicle cabin.

On the other hand, the inside air introduction rate increasing control is prohibited when there is a request for warming the inside of the vehicle cabin, the air conditioner is off, and air is being blown in the outside air introduction mode. That is, the inside air introduction rate is reduced, or the inside air introduction rate is set to zero. In this way, the warm air warmed by the heat in the motor compartment is blown into the vehicle cabin with little cooling, which contributes to heating the inside of the vehicle cabin. As described above, warming efficiency can be improved by effectively utilizing the heat in the motor compartment to contribute to warming the inside of the vehicle cabin.

In the vehicular air conditioner according to the aspect, the inside air introduction rate control prohibitor may not prohibit the inside air introduction rate increasing control when there is a request for dehumidifying the inside of the vehicle cabin.

When the inside air introduction rate increasing control is prohibited when there is a request for dehumidifying the inside of the vehicle cabin, the air of a relatively high temperature (air warmed by the heat in the motor compartment) needs to be cooled and dehumidified. In this case, the dehumidifying load of the air conditioner increases. This may result in a deterioration in the energy consumption rate of the air conditioner. For this reason, according to the aspect, when there is a request for dehumidifying the inside of the vehicle cabin, the inside air introduction rate increasing control is not prohibited, and the inside air introduction rate is increased. That is, by reducing the volume of outside air introduced, the dehumidifying load of the air conditioner is kept low, and the energy consumption rate of the air conditioner is improved.

The vehicular air conditioner according to the aspect may be mounted on an electric vehicle that does not include an internal combustion engine as a driving power source for traveling.

Vehicles on which an internal combustion engine (typical vehicles) is mounted effectively utilizes the waste heat of the internal combustion engine used to heat the vehicle cabin, whereas electric vehicles employ a heat pump, a water heater, or the like as an air conditioner (warming device) that can warm the inside of the vehicle cabin. That is, the electric vehicles need energy for warming the inside of the vehicle cabin. In the related art in which the heat in the motor compartment cannot be effectively utilized, the air conditioning load of the air conditioner (heat pump, water heater, or the like) increases when a warming request is made. According to the aspect, since the heat in the motor compartment is effectively utilized to contribute to warming the inside of the vehicle cabin as described above, the air conditioning load (warming load) of the air conditioner can be kept low. Therefore, the energy consumption rate of the air conditioner can be improved.

The vehicular air conditioner according to the aspect may further include a heat pump configured such that a refrigerant circuit is switched according to a cooling request and a warming request in the vehicle cabin and an evaporator provided in an air conditioning duct through which air blown into the vehicle cabin flows and configured to cool air flowing through the air conditioning duct by evaporating refrigerant at a time of the cooling request, and a temperature to be compared with the temperature of the outside air may be a temperature detected by an evaporator temperature sensor attached to the evaporator, instead of the temperature in the motor compartment.

In general, a heat pump is provided with an evaporator temperature sensor for detecting a refrigerant temperature of the evaporator. When the air conditioner is off and there is no request for dehumidifying the inside of the vehicle cabin, that is, when the refrigerant is not circulated by the heat pump, the temperature detected by the evaporator temperature sensor is the temperature of the air passing through the evaporator. Then, according to the aspect, the temperature detected by the evaporator temperature sensor is compared with the temperature of the outside air, and in the situation where the temperature detected by the evaporator temperature sensor is higher than the temperature of the outside air, the above-described inside air introduction rate increasing control and control for prohibiting the inside air introduction rate increasing control are performed. In this way, each control can be performed while accurate determination is being made whether or not the heat in the motor compartment can be effectively utilized.

According to the aspect of the disclosure, when there is no request for warming the inside of the vehicle cabin, the air conditioner is off and air is being blown in the outside air introduction mode, the inside air introduction rate increasing control is performed that changes the inside air introduction rate to be increased such that the occupant does not feel discomfort due to the warm air warmed by the heat in the motor compartment being blown into the vehicle cabin, and in contrast, the inside air introduction rate increasing control is prohibited on the condition that there is a request for warming the inside of the vehicle cabin, the air conditioner is off, and air is being blown in the outside air introduction mode. In this way, warming efficiency can be improved by effectively utilizing the heat in the motor compartment to contribute to warming the inside of the vehicle cabin when a request for warming the inside of the vehicle cabin is made.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing a procedure of an operation of adjusting an inside air introduction rate.

DETAILED DESCRIPTION OF EMBODIMENTS

Hereinafter, embodiments of the disclosure will be described with reference to the drawings. The embodiments will be described for a case where the disclosure is applied to a vehicular air conditioner mounted on an electric vehicle.

Peripheral Structure of Cowl

Figure 1:
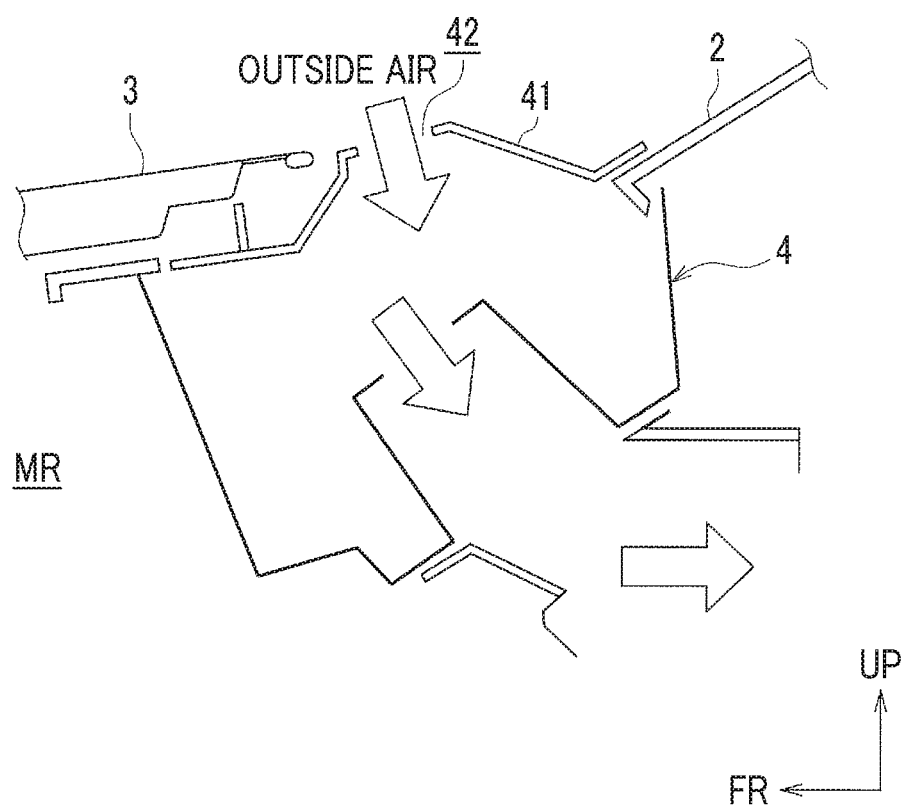
FIG. 1 is a sectional view illustrating a peripheral structure of a cowl of a vehicle according to an embodiment.

FIG. 1 is a sectional view illustrating a peripheral structure of a cowl of a vehicle according to an embodiment. In FIG. 1, an arrow FR indicates a direction toward a front portion of the vehicle, and an arrow UP indicates a direction toward the top of the vehicle.

Figure 2:
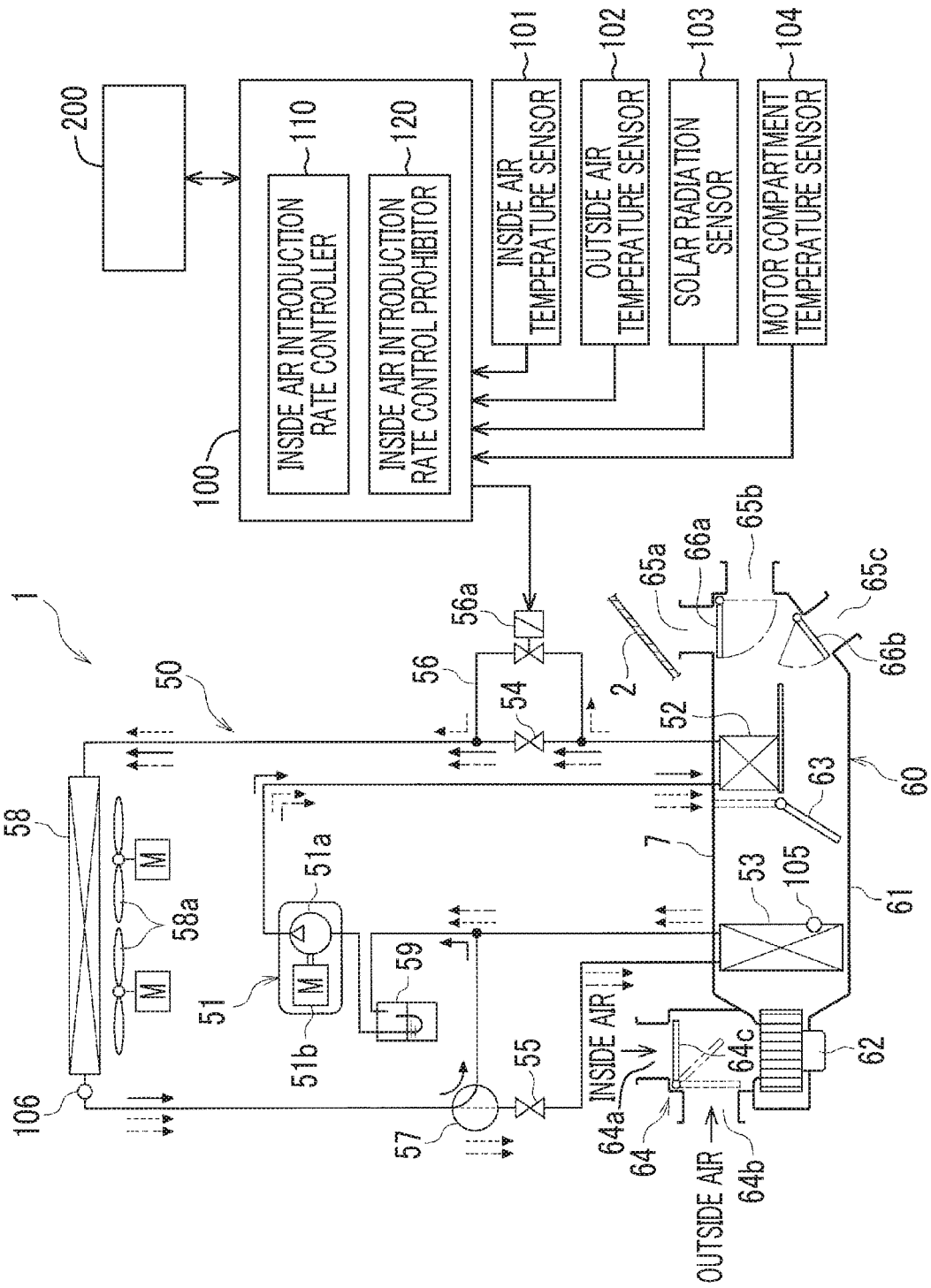
FIG. 2 is a diagram illustrating a schematic configuration of a vehicular air conditioner.

As shown in FIG. 1, in the vehicle according to the embodiment, a cowl 4 is provided between a windshield (front glass) 2 and a front hood (bonnet) 3, and in a cowl louver 41 in the cowl 4, a suction port 42 for introducing outside air toward the vehicular air conditioner 1 (see FIG. 2).

The interior of the cowl 4 is connected to an outside air introduction port 64b of a vehicular air conditioner 1, and in an outside air introduction mode of the vehicular air conditioner 1, the outside air introduced from the suction port 42 is introduced into an air conditioning duct 61 of the vehicular air conditioner 1 from the outside air introduction port 64b through the cowl 4.

The temperature of the cowl 4 rises by receiving heat in a motor compartment MR (the heat generated by the operation of a motor for traveling or an inverter (not shown) mounted in the motor compartment MR) when the system of the electric vehicle is operating, and the temperature of the outside air rises in the outside air introduction mode by the outside air receiving heat from the cowl 4 when the outside air introduced from the suction port 42 passes through the cowl 4. Furthermore, the outside air introduced into the cowl 4 from a drain hole (not shown) (an opening for discharging rainwater flowing into the cowl 4) also rises in temperature. From these reasons, in the outside air introduction mode in the system operating state of the electric vehicle, air (outside air) introduced into the air conditioning duct 61 of the vehicular air conditioner 1 rises in temperature.

Schematic Structure of Vehicular Air Conditioner

FIG. 2 is a diagram illustrating a schematic configuration of the vehicular air conditioner 1 mounted in the vehicle according to the embodiment. As illustrated in FIG. 2, the vehicular air conditioner 1 includes a heat pump 50, an indoor air conditioning unit 60 for blowing, into the vehicle cabin, a temperature-regulated air regulated in temperature by the heat pump 50, an air conditioning control device 100 for controlling the operations of various electric components of the vehicular air conditioner 1, and the like. In the embodiment, a heat pump 50 including three heat exchangers 52, 53, 58 and a three-way valve 57 is described by way of example, but the heat pump is not limited thereto.

Heat Pump

The heat pump 50 is configured to be capable of switching among a cooling mode refrigerant circuit that cools air blown into the vehicle cabin (blown air) to cool the vehicle cabin, a warming mode refrigerant circuit that heats the blown air to warm the inside of the vehicle cabin, and a dehumidification warming mode refrigerant circuit that reheats the blown air dehumidified by cooling to dehumidify and warm the inside of the vehicle cabin.

In FIG. 2, the flow of the refrigerant in the cooling mode is indicated by a dashed arrow, the flow of the refrigerant in the warming mode is indicated by a solid arrow, and the flow of the refrigerant in the dehumidification warming mode is indicated by an alternated long and short broken line arrow.

The heat pump 50 includes a compressor 51 that compresses and discharges the refrigerant, an indoor condenser 52 that heats the blown air, an indoor evaporator 53 that cools the blown air, a warming fixed throttle 54 that decompresses and expands the refrigerant, a cooling fixed throttle 55, an outdoor heat exchanger 58, an on-off valve 56a and the three-way valve 57 that switches the refrigerant circuit, and the like.

The compressor 51 is disposed in the motor compartment MR to suck, compress, and discharge the refrigerant, and may be an electric compressor that causes an electric motor 51b to drive a fixed capacity compression mechanism 51a having a fixed discharge capacity.

The electric motor 51b is an AC motor in which the operation (rotation speed) is controlled by an AC voltage output from the inverter (not shown). The inverter outputs an AC voltage of a frequency according to a control signal output from the air conditioning control device 100. Then, the refrigerant discharge capacity of the compressor 51 is changed by the rotation speed control using the variable frequency.

A refrigerant inlet of the indoor condenser 52 is connected to a discharge port of the compressor 51. The indoor condenser 52 is a warming heat exchanger disposed in the air conditioning duct 61 that provides an air passage for air blown into the vehicle cabin in the indoor air conditioning unit 60 and exchanging heat between air and the refrigerant flowing through the air conditioning duct 61 to heats the air.

A refrigerant inlet of the outdoor heat exchanger 58 is connected to a refrigerant outlet of the indoor condenser 52 through the warming fixed throttle 54.

Furthermore, in the embodiment, a bypass passage 56 is provided to guide the refrigerant flowing out of the indoor condenser 52 to the refrigerant inlet of the outdoor heat exchanger 58 by bypassing the warming fixed throttle 54. In the bypass passage 56, the on-off valve 56a that opens and closes the bypass passage 56 is provided.

The on-off valve 56a switches among the refrigerant circuit in the cooling mode, the refrigerant circuit in the warming mode, and the refrigerant circuit in the dehumidification warming mode, and is an electromagnetic valve of which operations is controlled by control signals output from the air conditioning control device 100. Specifically, the on-off valve 56a of the embodiment opens in the cooling mode, and closes in the warming mode and in the dehumidification warming mode.

The outdoor heat exchanger 58 is disposed in the motor compartment MR and exchanges heat between the refrigerant flowing out of the indoor condenser 52 and air outside the vehicle cabin (outside air) blown from a blowing fan 58a. The blowing fan 58a is an electric blower of which the rotation speed (blowing capacity) is controlled by control signals output from the air conditioning control device 100.

The three-way valve 57 is connected to the refrigerant outlet of the outdoor heat exchanger 58. The three-way valve 57 includes a refrigerant circuit switching unit that switches among the refrigerant circuits in respective operating modes described above, together with the on-off valve 56a, and an electric valve of which operations are controlled by control signals output from the air conditioning control device 100.

Specifically, in the cooling mode and in the dehumidification warming mode, the three-way valve 57 is brought into a switching state shown by the broken line in FIG. 2 and is switched to the refrigerant circuit connecting the refrigerant outlet of the outdoor heat exchanger 58 with the cooling fixed throttle 55. In the warming mode, the three-way valve 57 is brought into a switching state shown by the solid line in FIG. 2 and is switched to the refrigerant circuit connecting the refrigerant outlet of the outdoor heat exchanger 58 and the refrigerant inlet of an accumulator 59 disposed close to the suction port of the compressor 51.

The indoor evaporator 53 is a heat exchanger for cooling that is disposed in the air conditioning duct 61 of the indoor air conditioning unit 60, upstream of the indoor condenser 52 in the flow of the blown air and cools the blown air by exchanging heat between the blown air and the refrigerant flowing through the air conditioning duct 61.

The inlet of the accumulator 59 is connected to the refrigerant outlet of the indoor evaporator 53. The accumulator 59 is a gas-liquid separator that separates gas and liquid in the refrigerant flowing to the inside to store the surplus refrigerant in the heat pump 50. Furthermore, the suction port of the compressor 51 is connected to a gas-phase refrigerant outlet of the accumulator 59.

Indoor Air Conditioning Unit

Next, the indoor air conditioning unit 60 will be described. The indoor air conditioning unit 60 is disposed in an instrument panel in a front portion of the vehicle cabin, and includes a blower 62, the indoor evaporator 53, the indoor condenser 52, an air mix door 63, and the like housed in the air conditioning duct 61.

An inside air-outside air switching device 64 that switches between the inside air (air in the vehicle cabin) and the outside air to introduce air into the air conditioning duct 61 is disposed most upstream in the flow of the blown air of the air conditioning duct 61.

The inside air-outside air switching device 64 continuously adjusts opening areas of an inside air introduction port 64a and an outside air introduction port 64b that introduce the inside air and the outside air into the air conditioning duct 61, respectively, by an inside air-outside air switching door 64c to continuously change the air volume ratio of the volume of the inside air (volume of inside air circulated) and the volume of the outside air (volume of outside air introduced). In FIG. 2, the position of the inside air-outside air switching door 64c indicated by the solid line represents the position in the outside air introduction mode where the outside air introduction port 64b is fully opened and the inside air introduction port 64a is fully closed. In addition, the position of the inside air-outside air switching door 64c indicated by the broken line represents the position in the inside air circulation mode where the inside air introduction port 64a is fully opened and the outside air introduction port 64b is fully closed. Furthermore, the position of the inside air-outside air switching door 64c indicated by the two-dot broken line represents an example of a position where the inside air introduction port 64a and the outside air introduction port 64b are opened at predetermined rate, respectively, and the air volume ratio of the volume of inside air circulated and the volume of outside air introduced is adjusted. The inside air-outside air switching door 64c is driven by an electric actuator, and the operation of the electric actuator is controlled by control signals output from the air conditioning control device 100.

The blower 62 is disposed downstream of the inside air-outside air switching device 64 in the air flow, which blows air sucked through the inside air-outside air switching device 64 toward the vehicle cabin. The blower 62 is an electric blower in which a centrifugal multi-blade fan (sirocco fan) is driven with an electric motor, and the rotation speed (blowing air volume) is controlled by control signals output from the air conditioning control device 100.

The indoor evaporator 53 and the indoor condenser 52 are disposed sequentially in a direction in which the blown air flows, downstream of the blower 62 in the air flow.

The air mix door 63 is disposed in the air conditioning duct 61, which adjusts the air volume ratio of the volume of air that has passed through the indoor condenser 52 and the volume of air that has not passed through the indoor condenser 52, in the air blown after having passed through the indoor evaporator 53. The air mix door 63 is driven by an electric actuator for driving an air mix door, and the operation of the electric actuator is controlled by control signals output from the air conditioning control device 100.

Therefore, in the cooling mode and the dehumidification warming mode, the air volume ratio of the warm air that is reheated by the indoor condenser 52 and the cold air that bypasses the indoor condenser 52 in the blown air that has been cooled in the indoor evaporator 53 is adjusted by adjusting the opening degree of the air mix door 63. Then, by adjusting the air volume ratio, the temperature of the mixed air obtained by mixing the warm air and the cold air, that is, the air blown into the vehicle cabin is adjusted.

Further, a blowout port is provided most downstream in the flow of the air of the air conditioning duct 61, which blows out into the vehicle cabin the blown air that has passed through the indoor condenser 52 or the blown air that has bypassed the indoor condenser 52. As the blowout port, a defroster blowout port 65a that blows out conditioned air toward windshield 2, a face blowout port 65b that blows out conditioned air toward the upper body of an occupant in the vehicle cabin, and a foot blowout port 65c that blows out conditioned air toward the feet of the occupant are provided.

Further, blowout port switching doors 66a, 66b are disposed upstream in the flow of air of the defroster blowout port 65a, the face blowout port 65b, and the foot blowout port 65c.

The blowout port switching doors 66a, 66b function as an outlet mode switching unit for switching blowout modes, and are connected to an electric actuator for driving the blowout port switching doors, and are rotated in conjunction with the electric actuator. The operation of the electric actuator is also controlled by control signals output from the air conditioning control device 100.

In addition, as a blowout port mode in which switching is performed according to the positions of the blowout port switching doors 66a, 66b, there are a face mode in which air is blown out from the face blowout port 65b toward the upper body of the occupant in the vehicle cabin, a bi-level mode in which the face blowout port 65b and the foot blowout port 65c are opened to blow out air toward the upper body and feet of the occupant in the vehicle cabin, a food mode in which air is blown out from the foot blowout port 65c, and a foot defroster mode in which air is blown from the foot blowout port 65c and the defroster blowout port 65a.

An air conditioner operation panel 200 is provided on the instrument panel. Switch signals from various switches on the air conditioner operation panel 200 are input to the air conditioning control device 100. As various switches provided on the air conditioner operation panel 200, there are provided an auto (AUTO) switch for automatically controlling the vehicular air conditioner 1, an air conditioner (A/C) switch for forcibly operating the compressor 51, a suction port switching switch for switching suction port modes, a temperature setting switch for setting the temperature in the vehicle cabin to a desired temperature, an air volume switching switch for setting the blowing air volume of the blower 62 in a manual mode, a dehumidification switch (also referred to as a defogger switch), an blowout port switching switch for switching blowout modes, and the like.

Air Conditioning Control Device

Next, the air conditioning control device 100 will be described. The air conditioning control device 100 is constituted by a well-known microcomputer including a CPU, a ROM, a RAM, and the like, and peripheral circuits thereof. The air conditioning control device 100, performs various calculations and processes based on an air conditioning control program stored in the ROM, and controls operations of various air conditioning controllers connected to the output thereof, such as an inverter for the compressor 51, the on-off valve 56a, the three-way valve 57, the blowing fan 58a, the blower 62, and various electric actuators described above.

Detection signals from a sensor group for air conditioning control are input to the input of the air conditioning control device 100, where the sensor group includes an inside air temperature sensor 101 for detecting a vehicle cabin temperature (inside air temperature) Tr, and an outside air temperature sensor 102 for detecting an outside-vehicle-cabin temperature (outside air temperature) Tam, a solar radiation sensor 103 for detecting a solar radiation Ts applied to the vehicle cabin, a motor compartment temperature sensor 104 for detecting a temperature Tmr in the motor compartment MR, an evaporator temperature sensor 105 for detecting a refrigerant evaporation temperature (evaporator temperature) Te in the indoor evaporator 53, an outdoor unit temperature sensor 106 for detecting a refrigerant temperature To after heat exchange in the outdoor heat exchanger 58.

Description of Operation of Vehicular Air Conditioner

Next, each of the cooling mode, the warming mode, and the dehumidification warming mode, in which basic operations of the vehicular air conditioner 1 as described above are performed will be described.

Cooling Mode

The cooling mode is started when the set temperature set by the temperature setting switch is lower than the vehicle cabin temperature Tr in a state where the auto switch on the air conditioner operation panel 200 is ON or the air conditioner switch is ON. In the cooling mode, the three-way valve 57 is controlled such that the on-off valve 56a is opened and the refrigerant outlet of the outdoor heat exchanger 58 is connected to the refrigerant inlet of the cooling fixed throttle 55.

Accordingly, as shown by the dashed arrow in FIG. 2, a refrigeration cycle (a refrigerant circuit) is constructed in which refrigerant circulates in the order of the compressor 51, the indoor condenser 52, the bypass passage 56, the outdoor heat exchanger 58, the three-way valve 57, the cooling fixed throttle 55, the indoor evaporator 53, the accumulator 59, and the compressor 51. That is, the refrigeration cycle is constructed in which the outdoor heat exchanger 58 functions as a heat radiator (condenser) that radiates heat from the refrigerant and the indoor evaporator 53 functions as an evaporator that evaporates the refrigerant.

In the heat pump 50 in the cooling mode, the high-pressure high-temperature refrigerant compressed by the compressor 51 passes through the indoor condenser 52, flows into the outdoor heat exchanger 58 through the bypass passage 56, and then exchanges heat with the outside air blown from the blowing fan 58a in the outdoor heat exchanger 58 to radiate heat. The refrigerant flowing out of the outdoor heat exchanger 58 flows into the cooling fixed throttle 55 through the three-way valve 57 and is decompressed and expanded by the cooling fixed throttle 55. The low-pressure refrigerant decompressed by the cooling fixed throttle 55 flows into the indoor evaporator 53, and evaporates by absorbing heat from the air blown from the blower 62. The blown air passing through the indoor evaporator 53 is cooled by the heat absorption by the refrigerant. In addition, the blown air, which has been cooled in the indoor evaporator 53, is adjusted such that the blown air to be blown into the vehicle cabin approaches a target blowout temperature TAO. In this way, cooling in the vehicle cabin is achieved. The refrigerant flowing out of the indoor evaporator 53 flows into the accumulator 59. The gas-phase refrigerant that has been gas-liquid separated by the accumulator 59 is sucked into the compressor 51 and compressed again.

In the refrigerant circulating state as described above, the air conditioning control device 100 reads the detection signal of the sensor group for air conditioning control and the operation signal of the air conditioner operation panel 200. Then, the target blowout temperature TAO, which is the target temperature of the air blown into the vehicle cabin is calculated based on the values of the detection signal and the operation signal. Further, the operation states of various air conditioning controllers connected to the output of the air conditioning control device 100 are determined based on the calculated target blowout temperature TAO and the detection signal of the sensor group. Specifically, the blowing air volume of the blower 62, the opening degree of the air mix door 63, the blowout mode, the suction port mode, and the refrigerant discharge capacity of the compressor 51 are determined based on the target blowout temperature TAO with reference to a control map stored in the ROM of the air conditioning control device 100 in advance.

Warming Mode

The warming mode is started, for example, when, in a state where the auto switch on the air conditioner operation panel 200 is ON, the temperature set by the temperature setting switch is higher than the vehicle cabin temperature Tr. In the warming mode, the on-off valve 56a is closed, and the operation of the three-way valve 57 is controlled such that the refrigerant outlet of the outdoor heat exchanger 58 is connected to the refrigerant inlet of the accumulator 59. Furthermore, the air mix door 63 is displaced such that the total volume of the blown air after passing through the indoor evaporator 53 flows into the indoor condenser 52.

In this way, as shown by the solid arrow in FIG. 2, a refrigeration cycle is constructed in which the refrigerant circulates in the order of the compressor 51, the indoor condenser 52, the warming fixed throttle 54, the outdoor heat exchanger 58, the three-way valve 57, the accumulator 59, and the compressor 51. That is, a refrigeration cycle is constructed in which the indoor condenser 52 functions as a heat radiator and the outdoor heat exchanger 58 functions as an evaporator.

In the heat pump 50 in the warming mode, the refrigerant compressed in the compressor 51 radiates heat to the air blown from the blower 62 in the indoor condenser 52. In this way, the blown air passing through the indoor condenser 52 is heated, and heating the inside of the vehicle cabin is achieved. In addition, the refrigerant flowing out of the indoor condenser 52 is decompressed by the warming fixed throttle 54 and flows into the outdoor heat exchanger 58. The refrigerant flowing into the outdoor heat exchanger 58 evaporates by absorbing heat from air outside the vehicle cabin which has been blown from the blowing fan 58a. The refrigerant flowing out of the outdoor heat exchanger 58 flows into the accumulator 59 through the three-way valve 57. The gas-phase refrigerant that has been gas-liquid separated by the accumulator 59 is sucked into the compressor 51 and compressed again.

Even in such a refrigerant circulating state, the air conditioning control device 100 reads the detection signal of the sensor group for air conditioning control and the operation signal of the air conditioner operation panel 200, and calculates the target blowout temperature TAO, which the target temperature of air to be blown into the vehicle cabin, based on the values of the detection signal and the operation signal. Then, the blowing air volume of the blower 62, the blowout port mode, the suction port mode, and the refrigerant discharge capacity of the compressor 51 are determined based on the target blowout temperature TAO.

Dehumidification Warming Mode

The dehumidification warming mode is started, for example, when the auto switch on the air conditioner operation panel 200 is ON and the temperature set by the temperature setting switch is higher than the vehicle cabin temperature Tr and a dehumidification request is made by a dehumidification switch. In the dehumidification warming mode, the on-off valve 56a is closed, and the operation of the three-way valve 57 is controlled such that the refrigerant outlet of the outdoor heat exchanger 58 is connected to the refrigerant inlet of the cooling fixed throttle 55.

In this way, as shown by the dashed arrow in FIG. 2, a refrigeration cycle is constructed in which refrigerant circulates in the order of the compressor 51, the indoor condenser 52, the warming fixed throttle 54, the outdoor heat exchanger 58, the three-way valve 57, the cooling fixed throttle 55, the indoor evaporator 53, the accumulator 59, and the compressor 51.

In the heat pump 50 in the dehumidification warming mode, the high-pressure high-temperature refrigerant compressed in the compressor 51 exchanges heat with some of the blown air after passing through the indoor evaporator 53 in the indoor condenser 52 and thus some of the blown air is heated. Furthermore, the refrigerant flowing out of the indoor condenser 52 is decompressed in the warming fixed throttle 54 and flows into the outdoor heat exchanger 58. The refrigerant that has flown into the outdoor heat exchanger 58 radiates or absorbs heat by exchanging heat with outside air according to the relationship between the temperature of the refrigerant and the temperature of the outside air.

The refrigerant flowing out of the outdoor heat exchanger 58 flows into the cooling fixed throttle 55 through the three-way valve 57 and is decompressed and expanded in the cooling fixed throttle 55. The low-pressure refrigerant that has been decompressed in the cooling fixed throttle 55 flows into the indoor evaporator 53 and evaporates by absorbing heat from the air blown from the blower 62. By the absorbing of heat of the refrigerant, the blown air passing through the indoor evaporator 53 is cooled and dehumidified. As described above, in the dehumidification warming mode, dehumidifying and warming the inside of the vehicle cabin can be performed by heating the blown air that has been cooled in the indoor evaporator 53 with the indoor condenser 52 and blowing out the heated air into the vehicle cabin.

Even in such a refrigerant circulating state, the air conditioning control device 100 reads the detection signal of the sensor group for air conditioning control and the operation signal of the air conditioner operation panel 200, and calculates the target blowout temperature TAO, which the target temperature of air to be blown into the vehicle cabin, based on the values of the detection signal and the operation signal. Then, the blowing air volume of the blower 62, the opening degree of the air mix door 63, the blowout mode, the suction port mode, and the refrigerant discharge capacity of the compressor 51 are determined based on the target blowout temperature TAO.

Operation of Adjusting Inside Air Introduction Rate

Next, an operation of adjusting an inside air introduction rate will be described, where the adjusting operation is performed according to environmental conditions and the like in a state where air is being blown in the outside air introduction mode.

As disclosed even in the above-mentioned JP 2004-306859 A, the operation of adjusting the inside air introduction rate is performed to suppress a situation in which, in a state where the compressor 51 of the heat pump 50 is stopped (the air conditioner is off) and air is being blown in an outside air introduction mode, warm air warmed by the heat in the motor compartment MR (warm air generated by warming outside air that has been introduced) is blown into the vehicle cabin, thereby giving the feeling of discomfort to the occupant. As described above, the reason why the introduced outside air is warmed by the heat in the motor compartment MR is that the temperature of the cowl 4 rises by receiving heat in a motor compartment MR (the heat generated by the operation of a motor for traveling or an inverter (not shown) mounted in the motor compartment MR) and the outside air and the like introduced from suction port 42 in the outside air introduction mode pass through the cowl 4.

The air conditioning control device 100 includes an inside air introduction rate controller 110. The inside air introduction rate controller 110 changes the inside air introduction rate to be high in a situation where the temperature in the motor compartment MR is higher than the temperature of the outside air, on the condition that there is no request for warming the inside of the vehicle cabin, the air conditioner is off, and air is being blown in the outside air introduction mode, and when the temperature of the air blown into the vehicle cabin (temperature of the air actually blown, sensing value, or the like) is higher than the temperature of the outside air by a predetermined temperature or more. That is, the inside air introduction rate is set to be larger than 0.

The inside air introduction rate controller 110 is implemented by a control program stored in the ROM of the air conditioning control device 100. The temperature Tmr in the motor compartment MR is detected by the motor compartment temperature sensor 104. The temperature Tam of the outside air is detected by the outside air temperature sensor 102. In this control, specifically, the position of the inside air-outside air switching door 64c is changed from the position indicated by the solid line in FIG. 2 (the position where the outside air introduction port 64b is fully opened and the inside air introduction port 64a is fully closed) to, for example, a position indicated by the two-dot chain line in FIG. 2 (the position at which the opening degree of the inside air introduction port 64a is increased). This makes the air of a relatively low temperature in the vehicle cabin mix into the outside air (warm air warmed by the heat in the motor compartment MR), which, in turn, makes the increase in temperature of the air blown into the vehicle cabin suppressed and the occupant does not feel discomfort, as described above. Hereinafter, the control is referred to as inside air introduction rate increasing control.

However, when the inside of the vehicle cabin is warmed by effectively using the heat in the motor compartment MR in the situation where there is a request for warming the inside of the vehicle cabin, setting the inside air introduction rate to be larger than 0 when the temperature of the air blown into the vehicle cabin is higher than the outside air temperature by a predetermined temperature or more lowers the temperature of the warm air once warmed, and thus there is a limit to improving the warming efficiency by effectively using the heat in the motor compartment MR. In particular, since the electric vehicle employs the above-described heat pump 50 as a warming device, energy for warming the inside of the vehicle cabin is needed. For this reason, in a situation where the heat in the motor compartment MR cannot be effectively utilized, the air conditioning load (warming load) of the vehicular air conditioner 1 increases, which leads to a deterioration of the energy consumption rate.

Therefore, in the embodiment, the inside air introduction rate increasing control is prohibited on the condition that there is a request for warming the inside of the vehicle cabin, the air conditioner is off, and air is being blown in the outside air introduction mode. That is, by making the opening degree of the inside air introduction port 64a smaller than when the inside air introduction rate increasing control is performed, the inside air introduction rate is reduced or set to be zero. Specifically, the air conditioning control device 100 includes an inside air introduction rate control prohibitor 120, and the inside air introduction rate control prohibitor 120 prohibits the inside air introduction rate increasing control performed by the inside air introduction rate controller 110.

Further, the inside air introduction rate control prohibitor 120 does not prohibit the inside air introduction rate increasing control when there is a request for dehumidifying the inside of the vehicle cabin, even in a situation where there is a request for warming the inside of the vehicle cabin and air is being blown in the outside air introduction mode. This is done by taking into account the following fact: when there is a request for dehumidifying the inside of the vehicle cabin, air of a relatively high temperature (air warmed by the heat in the motor compartment MR) needs to be cooled for dehumidification in the case where the inside air introduction rate increasing control is prohibited, and consequently, the dehumidifying load of the vehicular air conditioner 1 is increased and the energy consumption rate is deteriorated.

The inside air introduction rate control prohibitor 120 is also implemented by a control program stored in the ROM of the air conditioning control device 100.

Hereinafter, a procedure of an operation of adjusting the inside air introduction rate according to the embodiment will be described. FIG. 3 is a flowchart showing a procedure of the operation of adjusting the inside air introduction rate.

First, in step ST1, determination is made whether or not the current suction port mode is the outside air introduction mode. For example, when the outside air introduction mode has been set by the operation of the suction port switching switch by the occupant, the determination in step ST1 is YES.

When the current suction port mode is not the outside air introduction mode (it is the inside air circulation mode) and the determination in step ST1 is NO, determination is made that the operation of adjusting the inside air introduction rate is not needed, and the process is returned as it is.

When the current suction port mode is the outside air introduction mode, and the determination in step ST1 is YES, the process proceeds to step ST2, where determination is made whether or not the temperature Tmr in the motor compartment MR is higher than the temperature Tam of the outside air and the difference therebetween exceeds a predetermined value a. This is an operation for determining whether or not the heat in the motor compartment MR can be effectively utilized to contribute to heating the inside of the vehicle cabin in a situation where there is a request for warming the inside of the vehicle cabin, when the temperature Tmr in the motor compartment MR is high.

When the determination in step ST2 is NO, the process returns as it is because there is no situation where the heat in the motor compartment MR can be effectively utilized.

When the temperature Tmr in the motor compartment MR is higher than the temperature Tam of the outside air, the difference therebetween exceeds the predetermined value a, and the determination in step ST2 is YES, the process proceeds to step ST3, where determination is made whether there is a request for warming the inside of the vehicle cabin. For example, when the temperature set by the temperature setting switch is higher than the temperature Tr in the vehicle cabin in a state where the auto switch on the air conditioner operation panel 200 is turned on, determination is made that there is a request for warming the inside of the vehicle cabin and YES is determined in step ST3. In this case, normally, as described above, the refrigerant circuit in the warming mode or the dehumidification warming mode is established, and the refrigerant is circulated by the heat pump 50.

When there is no request for warming the inside of the vehicle cabin and the determination in step ST3 is NO, the process proceeds to step ST4, where determination is made whether or not the air conditioner is currently off (there is no request for cooling the inside of the vehicle cabin).

Currently, when the air conditioner is on and the determination in step ST4 is NO, the process is returned. In this case, for example, the above-described operation in the cooling mode is performed according to the request for cooling the inside of the vehicle cabin.

Currently, when the air conditioner is in the OFF state and the determination in step ST4 is YES, the process proceeds to step ST5, where the inside air introduction rate increasing control is performed. That is, as described above, in order to suppress a situation in which the warm air warmed by the heat in the motor compartment MR is blown into the vehicle cabin, thereby giving the feeling of discomfort to an occupant (an occupant who does not request warming), the inside air introduction rate is made larger than 0, and the air of the relatively low temperature in the vehicle cabin is mixed into the outside air (warm air warmed by the heat in the motor compartment MR) to suppress the temperature rise of the air blown into the vehicle cabin, such that the above discomfort to be felt by the occupant is not caused.

On the other hand, when there is a request for warming the inside of the vehicle cabin and the determination in step ST3 is YES, the process proceeds to step ST6, where determination is made whether or not there is currently a request for dehumidifying the inside of the vehicle cabin. For example, when the dehumidification request is made by the dehumidification switch, the determination in step ST6 is YES.

Currently, when there is no request for dehumidifying the inside of the vehicle cabin and the determination in step ST6 is NO, the process proceeds to step ST7, where the inside air introduction rate increasing control is prohibited. That is, the inside air-outside air switching door 64c is controlled to be rotated (controlled to be rotated in a direction to decrease the opening degree of the inside air introduction port 64a), and the opening degree of the inside air introduction port 64a is made relatively small as compared with the case where the inside air introduction rate increasing control is performed and the inside air introduction rate is reduced or set to be zero. In this way, the warm air warmed by the heat in the motor compartment MR is blown into the vehicle cabin without being substantially cooled, and as a result, it is possible for the warm air to contribute to warming the inside of the vehicle cabin.

Currently, when there is a request for dehumidifying the inside of the vehicle cabin and the determination in step ST6 is YES, the process proceeds to step ST5, where the inside air introduction rate increasing control is performed. That is, the inside air introduction rate increasing control is not prohibited. As described above, this is done by taking into account the following fact: when there is a request for dehumidifying the inside of the vehicle cabin, air of a relatively high temperature (air warmed by the heat in the motor compartment MR) needs to be cooled for dehumidification in the case where the inside air introduction rate increasing control is prohibited, and consequently, the dehumidifying load of the vehicular air conditioner 1 is increased and the energy consumption rate is deteriorated. That is, as the volume of outside air introduced is reduced, the dehumidifying load of the vehicular air conditioner 1 is kept low.

In the operation of adjusting the inside air introduction rate adjusting in the embodiment, the above operation is repeated.

For this reason, the operation of step ST5 in FIG. 3 is the inside air introduction rate increasing control performed by the inside air introduction rate controller 110, and the operation of step ST7 is the prohibiting operation of prohibiting the inside air introduction rate increasing control performed by the inside air introduction rate control prohibitor 120.

Effect of Embodiment

As described above, in the embodiment, the inside air introduction rate increasing control is prohibited (step ST7) when there is a request for warming the inside of the vehicle cabin, the air conditioner is off, and air is being blown in the outside air introduction mode. That is, the inside air introduction rate is set to be reduced, or the inside air introduction rate is set to zero. In this way, the warm air warmed by the heat in the motor compartment MR is blown into the vehicle cabin without being substantially cooled, and as a result, it is possible for the warm air to contribute to the warming of the vehicle cabin. As described above, heating efficiency can be improved by effectively utilizing the heat in the motor compartment MR to contribute to warming the inside of the vehicle cabin.

Further, even when there is a request for warming the inside of the vehicle cabin, the inside air introduction rate increasing control is not prohibited when there is a request for dehumidifying the inside the vehicle cabin (step ST6 step ST5). That is, when there is a request for dehumidifying the inside of the vehicle cabin, air of a relatively high temperature (air warmed by the heat in the motor compartment MR) needs to be cooled for dehumidification in the case where the inside air introduction rate increasing control is prohibited, and consequently, the dehumidifying load of the vehicular air conditioner 1 is increased and the energy consumption rate of the vehicular air conditioner 1 is deteriorated. For this reason, in the embodiment, when there is a request for dehumidifying the inside of the vehicle cabin, the inside air introduction rate increasing control is not prohibited, and the inside air introduction rate is increased. That is, by reducing the volume of outside air introduced, the dehumidifying load of the vehicular air conditioner 1 can be kept low, and accordingly, the energy consumption rate of the vehicular air conditioner 1 can be improved.

Modification

Next, a modification will be described. In the modification, the temperature (the temperature Tmr in the motor compartment MR in the above embodiment) to be compared with the temperature Tam of the outside air is changed. In the following description, just the differences from the above embodiment will be described.

In the modification, the evaporator temperature Te detected by the evaporator temperature sensor 105 is compared with the temperature Tam of the outside air, and in a situation where the evaporator temperature Te is higher than the temperature Tam of the outside air by a predetermined temperature or more, the inside air introduction rate increasing control and control for prohibiting the inside air introduction rate increasing control are performed.

Specifically, when air is being blown in the outside air introduction mode in a situation where the compressor 51 of the heat pump 50 is not operating and the refrigerant is not flowing through the indoor evaporator 53, the evaporator temperature sensor 105 detects the temperature of the air introduced from the outside air introduction port 64*b*. For this reason, in such a situation, the evaporator temperature Te is compared with the temperature Tam of the outside air, and in a situation where the evaporator temperature Te is higher than the temperature Tam of the outside air by a predetermined temperature or more, the inside air introduction rate increasing control and control for prohibiting the inside air introduction rate increasing control are performed.

Even in the modification, similarly to the above-described embodiment, when there is a request for warming the inside of the vehicle cabin, the warming efficiency can be improved by effectively using the heat in the motor compartment MR to contribute warming the inside of the vehicle cabin.

Further, in the modification, as described above, in a situation where the evaporator temperature Te is higher than the temperature Tam of the outside air by a predetermined temperature or more, the inside air introduction rate increasing control and the control for prohibiting the inside air introduction rate increasing control are performed. For this reason, each control can be performed while accurately determining whether or not the heat in the motor compartment MR can be effectively utilized.

Other Embodiments

The disclosure is not limited to the above-described embodiment and the modification, and all modifications and applications included in the scope of claims and the scope equivalent to the claims can be made.

For example, in the embodiment and the modification, the heat pump 50 has been employed as a unit for warming the inside of the vehicle cabin. The disclosure is not limited thereto, and a known water heater may be employed.

In the embodiment and modification, the case where the disclosure is applied to a vehicular air conditioner 1 mounted on an electric vehicle has been described. The disclosure is not limited thereto, and is also applicable to a typical vehicle on which an internal combustion engine is mounted as a driving power source for traveling, a hybrid vehicle on which an internal combustion engine and an electric motor are mounted as a driving power source for traveling, and a fuel cell vehicle on which a fuel cell is mounted as a driving power source for traveling. For the typical vehicle, the waste heat from the internal combustion engine contributes to warming the inside of the vehicle cabin, for the hybrid vehicle, the waste heat from the internal combustion engine and the heat generated by the electric motor contribute to warming the inside of the vehicle cabin, and for the fuel cell vehicle, the heat generated from the fuel cell stack contributes to warming the inside of the vehicle cabin.

In the above-described embodiments, the case of performing the inside air introduction rate increasing control or prohibiting the inside air introduction rate increasing control has been described in a state in which there is a request for warming the inside of the vehicle cabin, the refrigerant circuit in the warming mode is established, and the refrigerant is circulated in the heat pump 50. The disclosure is not limited thereto. When the heat in the motor compartment MR is effectively utilized to contribute to warming the inside of the vehicle cabin when there is a request for warming the inside of the vehicle cabin, there is no need to circulate the refrigerant in the heat pump 50 when the request for warming by the heat in the motor compartment MR is satisfied. Therefore, in this case, the inside air introduction rate increasing control may be performed or the inside air introduction rate increasing control may be prohibited, in the state where the refrigerant is not circulated in the heat pump 50.

The disclosure is applicable to the vehicular air conditioner in which the inside air introduction rate of the air blown into the vehicle cabin can be adjusted.

What is claimed is:

1. A vehicular air conditioner that allows a volume of outside air introduced into a vehicle cabin and a volume of inside air circulated to be varied and allows an inside air introduction rate, which is a ratio of the volume of inside air circulated in a volume of air blown into the vehicle cabin, to be adjusted, the vehicular air conditioner comprising:
   an inside air introduction rate controller; and
   an inside air introduction rate control prohibitor, wherein:
   in a situation where a temperature in a motor compartment is higher than a temperature of outside air;
   the inside air introduction rate controller is configured to perform an inside air introduction rate increasing control that changes the inside air introduction rate to be increased on a condition that there is no request for warming an inside of the vehicle cabin, the air conditioner is off, and air is being blown in an outside air introduction mode; and the inside air introduction rate control prohibitor is configured to prohibit the inside air introduction rate increasing control on a condition that there is a request for warming the inside of the vehicle cabin, the air conditioner is off, and air is being blown in the outside air introduction mode.

2. The vehicular air conditioner according to claim 1, wherein the inside air introduction rate control prohibitor does not prohibit the inside air introduction rate increasing control when there is a request for dehumidifying the inside of the vehicle cabin.

3. The vehicular air conditioner according to claim 1, wherein the vehicular air conditioner is mounted on an electric vehicle that does not include an internal combustion engine as a driving power source for traveling.

4. The vehicular air conditioner according to claim 1, further comprising:
- a heat pump configured such that a refrigerant circuit is switched in response to a request for cooling and a request for warming, the inside of the vehicle cabin; and
- an evaporator provided in an air conditioning duct through which air blown into the vehicle cabin flows and configured to cool air flowing through the air conditioning duct by evaporating refrigerant at a time of the cooling request, wherein a temperature to be compared with the temperature of the outside air is a temperature detected by an evaporator temperature sensor attached to the evaporator, instead of the temperature in the motor compartment.

* * * * *